(12) United States Patent
Kim et al.

(10) Patent No.: US 7,190,944 B2
(45) Date of Patent: Mar. 13, 2007

(54) METHOD FOR PERFORMING HANDOVER BASED COMPRESSED MODE AND COMMON FREQUENCY OF NEIGHBOR CELLS

(75) Inventors: Il-Gyu Kim, Seoul (KR); Seung-Chan Bang, Taejon (KR); Jae-Heung Kim, Taejon (KR); Chang-Joo Kim, Taejon (KR)

(73) Assignee: Electronics and Telecommunications Research Institute (KR)

( * ) Notice: Subject to any disclaimer, the term of this patent is extended or adjusted under 35 U.S.C. 154(b) by 108 days.

(21) Appl. No.: 10/466,054

(22) PCT Filed: Dec. 28, 2001

(86) PCT No.: PCT/KR01/02293

§ 371 (c)(1),
(2), (4) Date: Jul. 9, 2003

(87) PCT Pub. No.: WO02/058279

PCT Pub. Date: Jul. 25, 2002

(65) Prior Publication Data

US 2004/0053615 A1 Mar. 18, 2004

(30) Foreign Application Priority Data

Jan. 10, 2001 (KR) ................... 2001/1434

(51) Int. Cl.
*H04B 1/06* (2006.01)
*H05K 11/02* (2006.01)
*H04Q 7/00* (2006.01)
(52) U.S. Cl. ...................... 455/346; 370/331
(58) Field of Classification Search ............... 455/436; 370/331, 332, 335, 336
See application file for complete search history.

(56) References Cited

U.S. PATENT DOCUMENTS 5,175,867 A * 12/1992 Wejke et al. ............... 455/439

(Continued)

FOREIGN PATENT DOCUMENTS

KR 1019970008949 6/1997
KR 100259846 B1 3/2000

OTHER PUBLICATIONS

IEEE International Symposium on Personal, Indoor and Mobile Radio Communications, 1997, Waves of the Year 2000 PIMRC '97, vol. 1, pp. 231-235.

*Primary Examiner*—William Trost
*Assistant Examiner*—Marivelisse Santiago-Cordero
(74) *Attorney, Agent, or Firm*—Blakely Sokoloff Taylor & Zafman

(57) ABSTRACT

A method for performing a handover based on a compressed mode and a common frequency of neighbor cells is disclosed. The method for performing a handover includes the steps of: a) measuring the signal intensities of a common frequency of a source base station and a target base station, wherein the signal intensity is measured by the mobile station based on a downlink compressed mode; b) determining whether a handover is necessary or not, based on the signal intensities of the common frequency; c) if the handover is necessary, at the source base station, allowing the mobile station to perform intra cell hard handover from a frequency used for communication between the mobile station and the source base station to the common frequency; and then d) allowing the mobile station to perform a soft handover from the source base station to the target base station based on the common frequency.

6 Claims, 5 Drawing Sheets

U.S. PATENT DOCUMENTS

| | | | |
|---|---|---|---|
| 5,258,980 A * | 11/1993 | Maebara et al. | 370/347 |
| 5,345,448 A | 9/1994 | Keskitalo | |
| 5,533,014 A | 7/1996 | Willars et al. | |
| 5,542,098 A | 7/1996 | Bonta | |
| 5,566,168 A | 10/1996 | Dent | |
| 5,828,659 A * | 10/1998 | Teder et al. | 370/328 |
| 5,920,818 A | 7/1999 | Frodigh et al. | |
| 6,081,714 A * | 6/2000 | Wakizaka | 455/437 |
| 6,208,631 B1 * | 3/2001 | Kim | 370/332 |
| 6,385,437 B1 * | 5/2002 | Park et al. | 455/69 |
| 6,393,003 B1 * | 5/2002 | Lee | 455/436 |
| 6,469,995 B1 * | 10/2002 | Voyer et al. | 370/331 |
| 6,501,744 B1 * | 12/2002 | Alexandre | 370/335 |
| 6,597,679 B1 * | 7/2003 | Willars | 455/436 |
| 6,618,364 B2 * | 9/2003 | Yanai | 455/436 |
| 6,667,961 B1 * | 12/2003 | Park et al. | 455/436 |
| 6,741,577 B1 * | 5/2004 | Henon | 370/331 |
| 6,741,859 B2 * | 5/2004 | Otsuka et al. | 455/438 |
| 6,868,075 B1 * | 3/2005 | Narvinger et al. | 370/335 |
| 6,999,784 B1 * | 2/2006 | Choi | 455/522 |
| 2001/0008521 A1 * | 7/2001 | Virtanen | 370/331 |
| 2002/0006119 A1 * | 1/2002 | Steudle | 370/329 |
| 2002/0051432 A1 * | 5/2002 | Shin | 370/331 |
| 2002/0132628 A1 * | 9/2002 | Matsumoto et al. | 455/456 |

* cited by examiner

METHOD FOR PERFORMING HANDOVER BASED COMPRESSED MODE AND COMMON FREQUENCY OF NEIGHBOR CELLS

The present patent application is a non-provisional application of International Application No. PCT/KR01/02293, filed Dec. 28, 2001.

TECHNICAL FIELD

The present invention relates to a method for performing a handover based on a compressed mode and a common frequency of neighbor cells; and, more particularly, to a method for performing a handover without disconnection of signals in a downlink/uplink by measuring a signal intensity of a new frequency transmitted from a target base station by using the compressed mode before a mobile station completely disconnects a frequency, which is currently established communication link, performing a hard handover to a frequency commonly used in a source base station, if the signal intensity is satisfied by a handover condition and then performing a soft handover to a common frequency between the source base station and a neighbor base station and a computer readable recording medium for executing the handover method.

BACKGROUND ART

It is widely known that a soft handover, which performs a handover without changing a frequency, can be used in a code division multiple access (CDMA) cellular system because all base stations of one wireless communication service provider can use the same frequency.

The soft handover is a method for maintaining a communication link by simultaneously transmitting the signal to the source base station and the neighbor target base station without changing a communication frequency when a mobile station is located at boundary of cells, that is, the mobile station moves from a coverage of the source base station to another coverage of the neighbor base station, disconnecting a communication link to the source base station, if the signal intensity of the signal from the source base station is weaken below a reference signal intensity, and maintaining the communication link to the neighbor base station.

The above-mentioned soft handover provides a seamless handover by eliminating short disconnections of the signal, which is a chronic problem of an analog system, decreases a probability of call loss and maintains high quality communication.

However, the soft handover is not applicable in case the communication service provider allocates a different number of frequencies to each of the neighbor base stations according to a call intensity by considering an economy of a network design and an efficiency of investment, that is, the neighbor base station uses different frequencies from each other. In this case, if the mobile station using a specific frequency of the source base station moves to the cell of the neighbor base station, which does not use the specific frequency, then the soft handover cannot be applicable, therefore, the hardware handover has to be used.

FIG. 1 is a view illustrating a conventional wireless communication system. It shows a hard handover situation between two base stations.

Referring to FIG. 1, a target base station 130 does not support a communication frequency $f_2$, which is used for communication between a mobile station 110 and a source base station 120. In this situation, if the mobile station 110 has a dual-mode receiver, the mobile station demodulates a downlink signal of the source base station 120 through the communication frequency $f_2$, and simultaneously measures a signal intensity of a new frequency $f_1$ and acquires a synchronization of a transmission signal of the target base station 130.

However, the above-mentioned dual-mode receiver needs an additional radio frequency (RF) hardware comparing to a single-mode receiver. Therefore, a complexity of the hardware of the mobile station is increased.

For overcoming the above-mentioned problems, a compressed mode is defined at an asynchronous W-CDMA (FDD: Frequency Division Duplex) standard (Release '99) of a $3^{rd}$ generation partnership project (3GPP), released on September, 2000.

FIG. 2 is a diagram illustrating a conventional structure of a compressed mode transmission.

Referring to FIG. 2, in the 3GPP standard, a frame has a 10 msec length and 15 slots.

In a compressed frame 220, data transmission is not permitted during a transmission gap (TG) 230. Instead of permitting data transmission during the TG 230, a transmission power of the compressed frame outside the TG 230 region is kept higher than the transmission power of a normal frame 210, therefore, a possibility of frame error can be maintained identically to the normal frame 210.

By using the compressed mode in FIG. 2, a mobile station having the singe mode receiver can search the signal intensity of the new frequency $f_1$ in case of the handover situation shown in FIG. 1. That is, during the TG 230, the mobile station disconnects the current communication frequency $f_2$, changes to the new frequency $f_1$, measures the signal intensity of the new frequency, and then after passing the TG 230 region, the mobile station returns to the frequency $f_2$ and demodulates the signal of the frequency $f_2$ again.

In other words, the mobile station can monitor the new frequency $f_1$ before completely disconnecting the current established communication link in case of the handover situation as shown in FIG. 1, the synchronization of the downlink signal transmitted from the target base station can be acquired by using a synchronization channel and common pilot channel of $f_1$, therefore, the current call of the downlink is not disconnected even if the current established call is disconnect and the hard handover to the new frequency $f_1$ is performed.

However, in case of uplink, the target base station cannot receive any signal before the hard handover execution. So the target base station should synchronize with the new frequency $f_1$ after the mobile station completely disconnects the old frequency $f_2$ and starts with new frequency $f_1$.

In the above-mentioned situation, even if high quality searcher is used in the target base station, at least 1 frame should be spent for acquiring the synchronization of the uplink, therefore, transmission frames are disconnected shortly at the moment.

Also, since a round trip delay between the mobile station and the target base station is unknown due to inter base station asynchronous operation of the 3GPP W-CDMA (FDD) type, if a cell coverage of the base station is wider, then a search window size becomes very large so a time for acquiring the uplink synchronization of the target base station is spent more than several frames.

In the above-mentioned case, the discontinuation of several frames may happen and in worst case, the call drop may take place. Also, in this case, since an uplink power control cannot operate adequately, a capacity of the uplink of the target base station can be decreased badly.

In the 3GPP W-CDMA standard (release 99), the handover is possible only in case a frame offset, which is a difference of a system frame number (SFN) of the target base station and a connection frame number (CFN), is known to the radio network.

Before performing the handover, the mobile station measures the SFN of target base station and calculates the frame offset, and then, report the frame offset information to the radio network.

The above-mentioned operation does not have any problem in the soft handover between identical frequencies but produce a problem in case the hard handover is performed between different frequencies.

That is, the single mode receiver of the mobile station has to use the compressed mode for acquiring the SFN of the target base station, however, since transmission gap length is less than 1 frame, it is impossible to acquire the SFN in 3GPP's Release '99 standard.

In the above-mentioned case, since the mobile station should obtain the SFN after completely disconnecting the currently established frequency and connecting to the new frequency, at least 50 msec of an additional disconnection is generated.

Instead of using the compressed mode, there is another method introduced for performing the handover in case the situation shown in FIG. 1, by establishing the communication link between the mobile station and the source base station, measuring the signal intensity of the received signal from the target base station by generating a dummy frequency in the downlink according to the frequency $f_2$ and performing the handover between the frequencies, if the handover condition is satisfied by the measured signal intensity.

However, the above-mentioned method also may increase a complexity of the base station due to a necessity of generation the dummy frequencies for all frequencies used in the system.

DISCLOSURE OF THE INVENTION

It is, therefore, an object of the present invention to provide a method for performing a handover without disconnection of a downlink/uplink signal. A mobile station measures a signal intensity of new frequency transmitted from a target base station based on the compressed mode before a mobile station completely disconnecting a frequency of a currently established communication link. If the signal intensity is satisfied by a handover condition, the mobile station performs an intra base station hard handover to a common frequency in a cell coverage of a source base station, and then performs a soft handover by using the common frequency between the source base station and a neighbor base station and a computer readable recording medium for executing the handover method.

In accordance with an aspect of the present invention, there is provided a method for performing a handover based on a compressed mode and a common frequency of neighbor base stations in a wireless communication system, including the steps of: a) receiving signal intensities of a common frequency of a source base station and a target base station, wherein the signal intensity is measured by a mobile station based on a downlink compressed mode ; b) determining whether a handover condition is satisfied based on the signal intensities; c) if the handover condition is satisfied, invoking the mobile station to perform an intra cell hard handover from a frequency, which is currently established communication link to the common frequency of the source base station and the target base station; and d) invoking the mobile station to perform a soft handover between the source base station to the target base station by using the common frequency of the source base station and the target base station.

In accordance with another aspect of the present invention, there is also provided a method for a handover by using a compressed mode implemented in a wireless communication system and a common frequency between neighbor stations, including the steps of: a) at a mobile station, measuring signal intensities of a common frequency of a target base station and a source base station based on a downlink compressed mode and reporting the signal intensities to a controller of a base station; b) according to a hard handover invocation received from the base station controller, performing an intra cell hard handover from a frequency of currently established communication link to the common frequency of the source base station and the target base station; and c) performing a soft handover between the source base station and the target base station by using the common frequency of the source base station and the target base station.

In accordance with still another aspect of the present invention, there is also provided a computer readable record medium storing instructions for executing the method for performing a handover based on a compressed mode and a common frequency between neighbor base stations, including functions of: a) receiving signal intensities of a common frequency of a source base station and a target base station, wherein the signal intensity is measured by a mobile station based on a downlink compressed mode; b) determining whether a handover condition is satisfied based on the signal intensities; c) if the handover condition is satisfied, invoking the mobile station to perform an intra cell hard handover from a frequency, which is currently established communication link to the common frequency of the source base station and the target base station; and d) invoking the mobile station to perform a soft handover between the source base station to the target base station by using the common frequency of the source base station and the target base station.

In accordance with still another aspect of the present invention, there is also provided a computer readable record medium storing instructions for executing the method for performing a handover based on a compressed mode and a common frequency between neighbor base stations, including functions of: a) at a mobile station, measuring signal intensities of a common frequency of a target base station and a source base station based on a downlink compressed mode and reporting the signal intensities to a controller of a base station; b) according to a hard handover invocation received from the base station controller, performing an intra cell hard handover from a frequency of currently established communication link to the common frequency of the source base station and the target base station; and c) performing a soft handover between the source base station and the target base station by using the common frequency of the source base station and the target base station.

BRIEF DESCRIPTION OF THE DRAWINGS

The above and other objects and features of the present invention will become apparent from the following description of the preferred embodiments given in conjunction with the accompanying drawings, in which.

MODES FOR CARRYING OUT THE INVENTION

Other objects and aspects of the invention will become apparent from the following description of the embodiments with reference to the accompanying drawings, which is set forth hereinafter.

Figure 1:
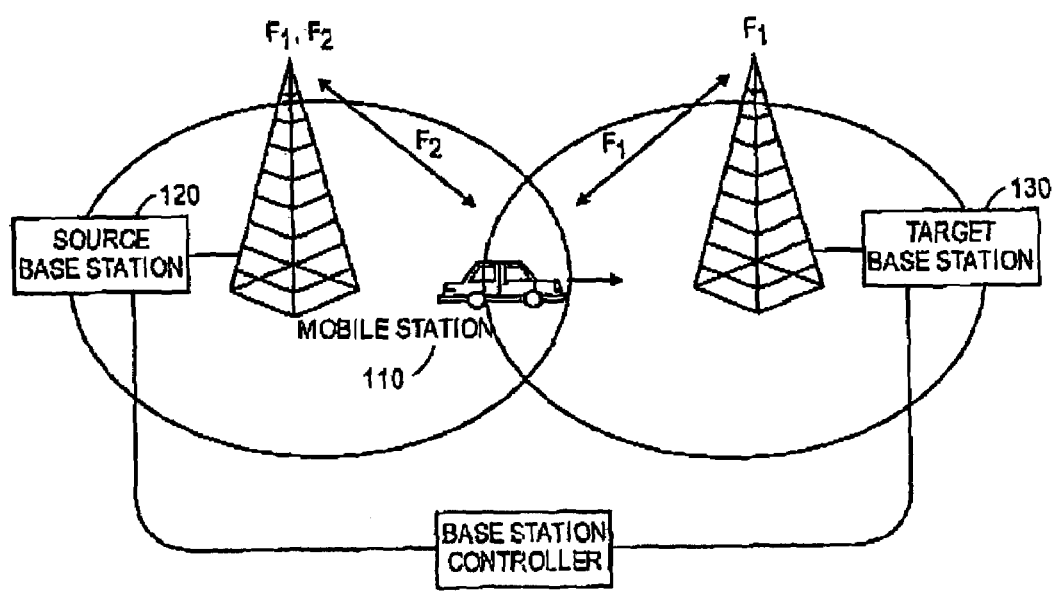
FIG. 1 is a view illustrating a conventional wireless communication system.
Figure 2:
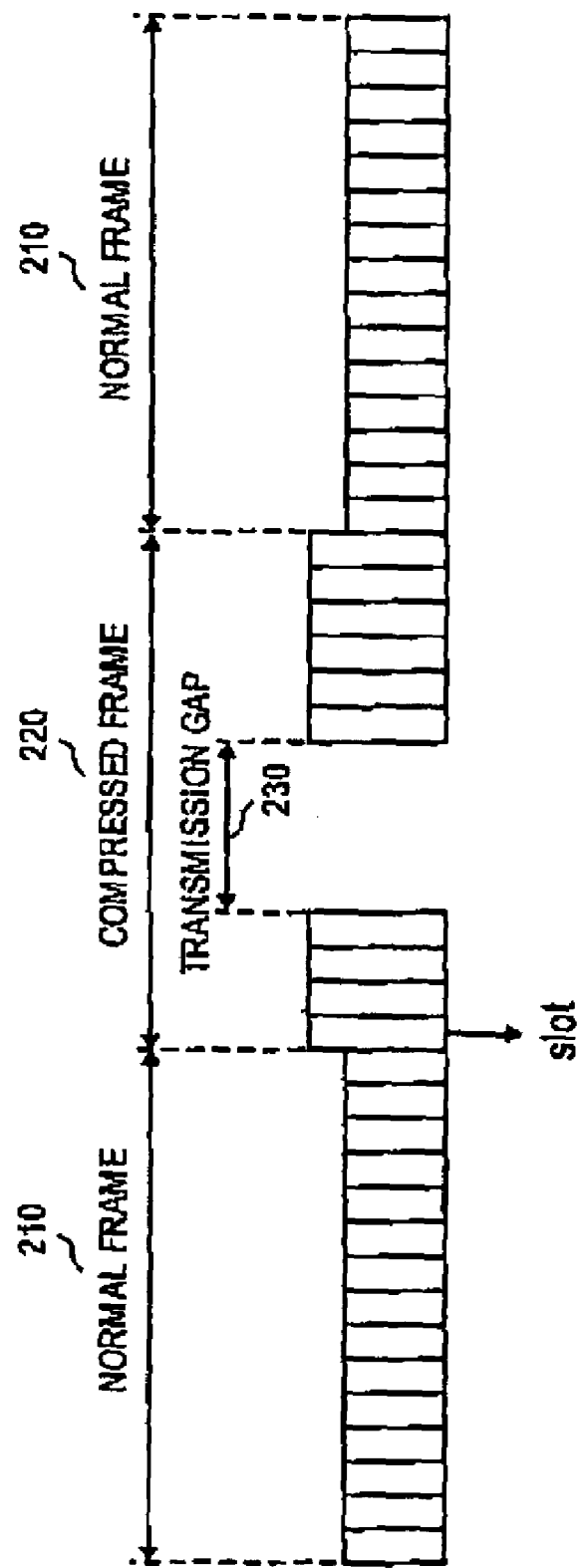
FIG. 2 is a diagram illustrating a compressed mode transmission.
Figure 3:
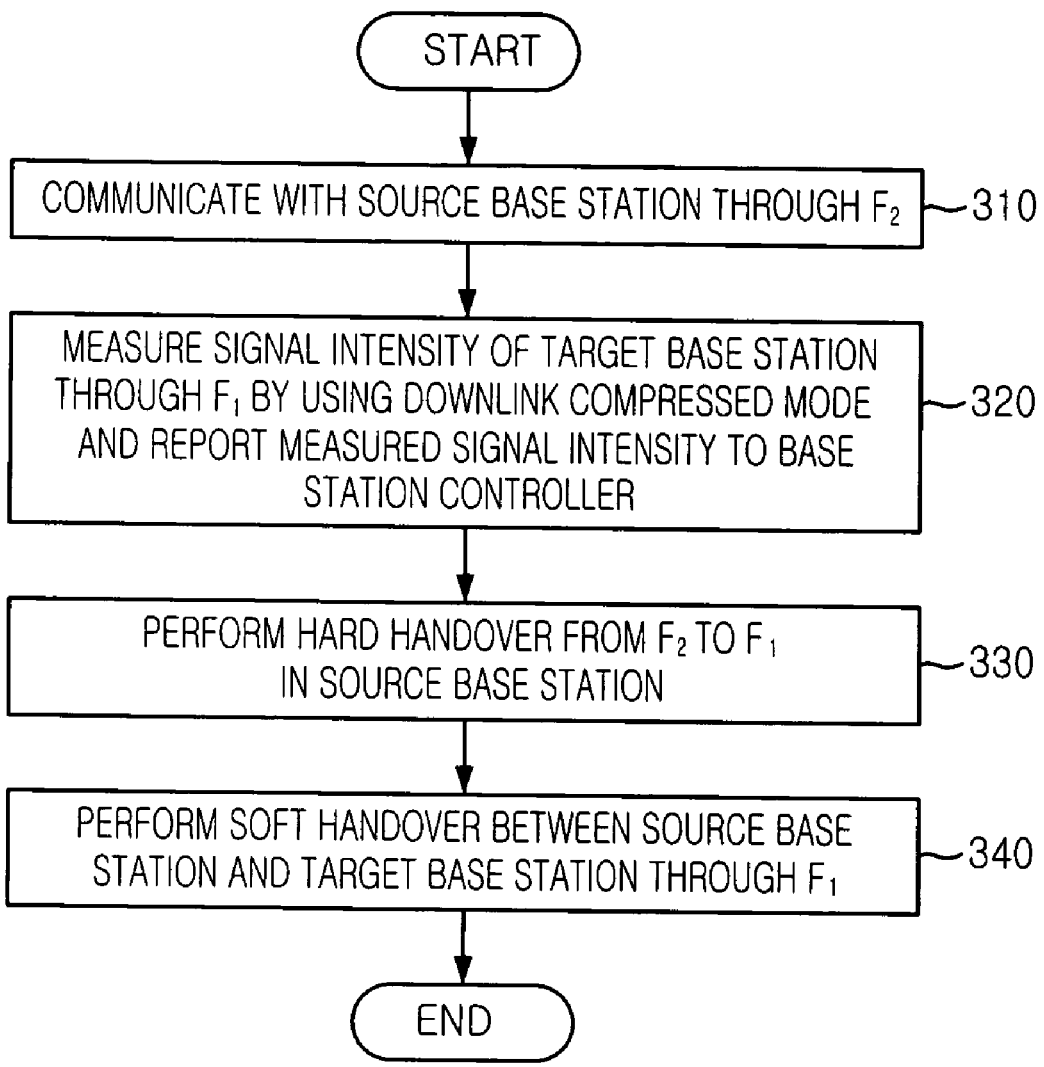
FIG. 3 is a flowchart of a handover method based on a compressed mode and a common frequency between neighbor base stations in accordance with the preferred embodiment of the present invention.

FIG. 3 is a flowchart of a handover method based on a compressed mode and a common frequency of neighbor base stations in accordance with the preferred embodiment of the present invention.

Referring to FIG. 3, in case that a mobile station needs to perform a handover when the mobile station is communicating with a source base station by using a frequency $f_2$ at step 310, a signal intensity of a target base station is measured first through the common frequency $f_1$ based on the compressed mode of downlink signal and reports the measured signal intensity to a base station controller at step 320.

At step 330, the base station controller invokes the mobile station to perform a hard handover between currently established frequency $f_2$ and the common frequency $f_1$ at the inside of the source base station at step 330. If the noticed signal intensity is satisfied to the handover condition and then the handover is completed by performing a soft handover between the source base station and the target base station at step 340 by using the common frequency $f_1$.

Figure 4:
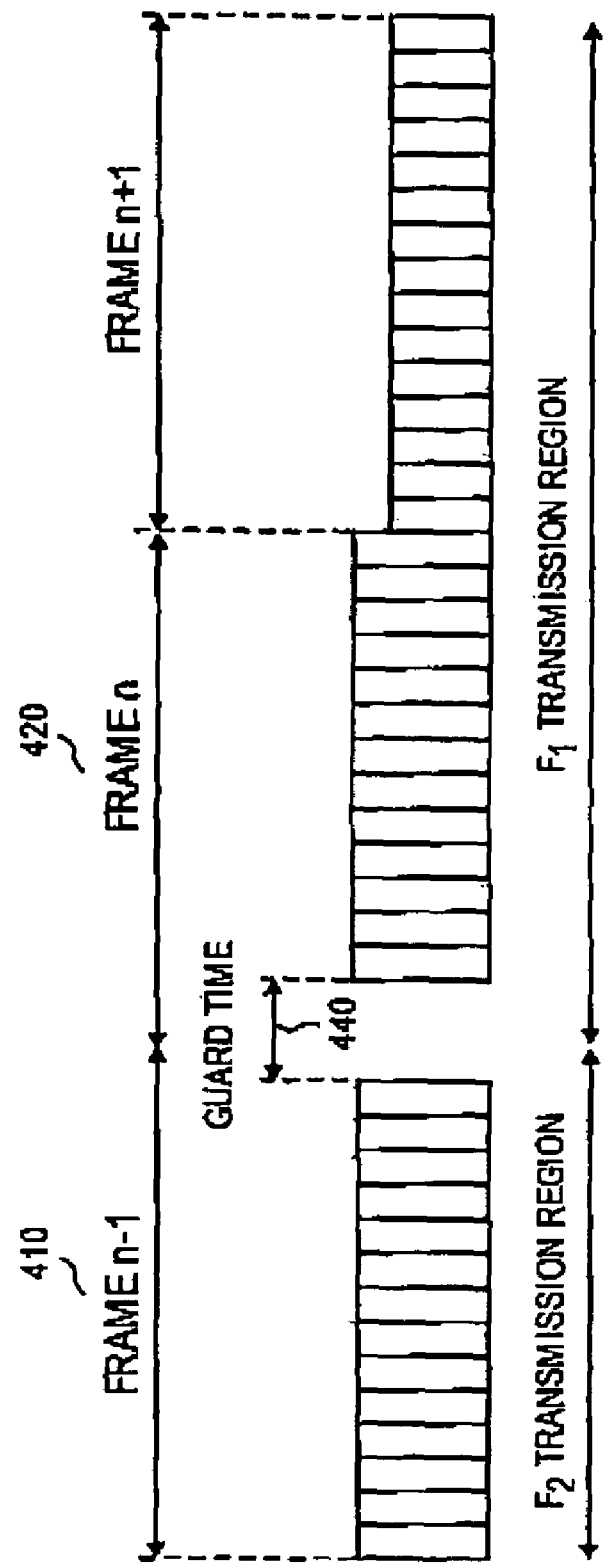
FIG. 4 is a diagram of a frame structure used in a handover in accordance with the present invention.

FIG. 4 is a diagram illustrating the structure of a frame used in a handover in accordance with the preferred embodiment of the present invention.

In the handover steps in FIG. 3, the frame having the structure shown in FIG. 4 is used when performing the hard handover between the currently established frequency $f_2$ and the common frequency $f_1$ at the inside of the source base station. The last frame of the frequency $f_2$ 410 and the first frame of frequency $f_1$ 420 are compressed frames and between the two compressed frames, there is a guard time 440 for changing the frequencies of the mobile station.

Figure 5:
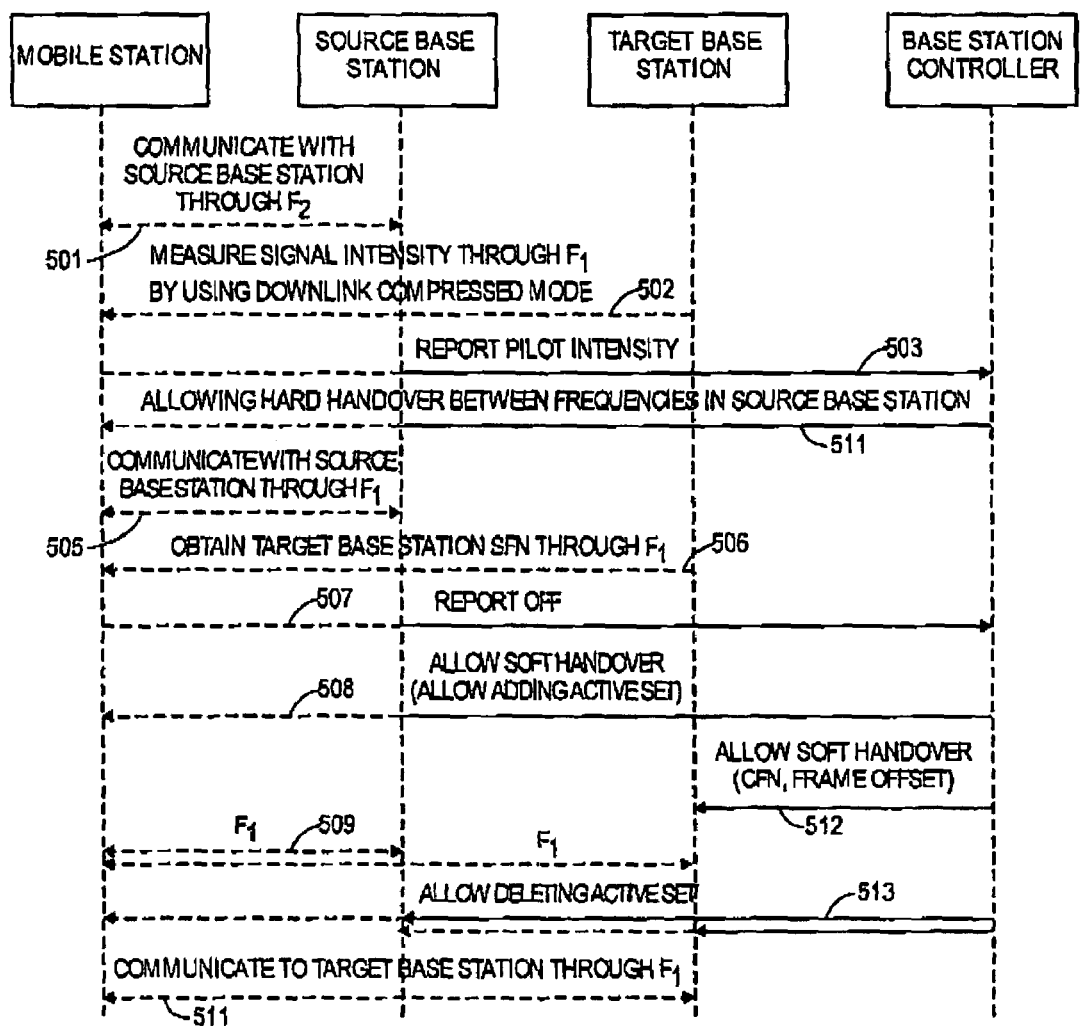
FIG. 5 is a view illustrating a signaling step between a mobile station, a source base station, a target base station and a base station controller in a handover method in accordance with the present invention.

FIG. 5 is a view illustrating a signaling procedures among a mobile station, a source base station, a target base station and a base station controller in a handover method in accordance with the preferred embodiment of the present invention.

Referring to FIG. 5, the mobile station, which communicates with the source station through the frequency $f_2$ at step 501, measures a signal intensity of the target base station through the common frequency $f_1$ of the neighbor stations based on a compressed mode downlink signal in case a dual mode receiver or a single mode receiver is used at step 502 and the measured signal intensity is reported to a base station controller at step 503.

When the measured signal intensity is reported, chip offset of the target base station is reported together, in here the chip offset is a difference between a boundary of a transport channel frame of the mobile station and a boundary of a common pilot channel (CPICH) of the target base station, the chip offset information has a range of 0 to 38399 and is defined as TS25.402 of 3 GPP (Release '99).

The base station controller, which receives the signal intensity of the signal transmitted to the target base station from the mobile station, determines whether a handover procedure is necessary. If the handover condition is satisfied, the base station controller invokes the mobile station to perform a hard handover between frequencies inside of the source base station at step 504. The mobile station, which is invoked to perform the hard handover from the base station controller at step 504, starts communication with the common frequency $f_1$, within source base station by using the frame of which structure is shown in FIG. 4 at step 505.

The mobile station, which completes the hard handover at step 505, acquires a system frame number (SFN) by demodulating a broadcasting channel of the target base station with common frequency $f_1$ at step 506, if there is an invocation of the base station controller to acquire the SFN, calculates a frame offset ($OFF_{target}$ in FIG. 5), which is a difference of the acquired SFN and a connection frame number (CFN) value of the mobile station and reports the calculated value to the base station controller at step 507.

In here, the frame offset ($OFF_{target}$) is the difference between the SNF of the target base station and the CFN of the mobile station and is defined at a TS25.402 of the standard of 3 GPP (release '99).

The base station controller, which receives the frame offset from the mobile station at step 507, invokes the target base station to perform a soft handover with the mobile station at step 508. The chip offset, the frame offset and the uplink scrambling code of the mobile station are reported to the target base station at step 512. Also, the mobile station receives an invocation to perform soft handover and an orthogonal variable spreading factor (OVSF), which is used for a new downlink, is noticed to the mobile station at step 508.

The mobile station and the target base station establishes a new communication link through the frequency $f_1$ by using the received information from the base station controller at step 509. In here, after establishing the communication link with the target base station at step 509, if the mobile station receives a command from the base station controller to disconnect the communication link to the source base station at step 513, the link to the source base station is released and the handover is completed, that is, only the communication link between the mobile station and the target base station at step 511.

As above-mentioned handover method can be implemented as a program and can be stored into a computer readable recording medium such as a CD-ROM, a RAM, a ROM, a floppy disk, a hard disk and an optical magnetic disk.

The present invention, as mentioned above, provides a method for performing a handover to one of the neighbor base stations without equipping additional hardware and without disconnection of a signal in the downlink/uplink, to thereby implement an efficient and stable wireless communication system.

While the present invention has been described with respect to certain preferred embodiments, it will be apparent to those skilled in the art that various changes and modifications may be made without departing from the scope of the invention as defined in the following claims.

The invention claimed is:

1. A method for performing a handover based on a compressed mode and a common frequency of neighbor base stations in a wireless communication system, comprising the steps of:
   a) receiving signal intensities of a common frequency of a source base station and a target base station, wherein the signal intensity is measured by a mobile station based on a downlink compressed mode;
   b) determining whether a handover condition is satisfied based on the signal intensities;
   c) if the handover condition is satisfied, invoking the mobile station to perform an intra cell hard handover from a frequency which is currently established communication link to the common frequency of the source base station and the target base station,
   wherein a plurality of compressed mode frames and a guard time between two compressed mode frames are used for the intra cell hard handover, the compressed mode frame preceding the guard time is a last frame of the frequency of the currently established communication link and the compressed mode frame following the guard time is a first frame of the common frequency; and
   d) invoking the mobile station to perform an inter-cell soft handover between the source base station to the target base station by using the common frequency of the source base station and the target base station.

2. The method as recited in claim 1, further comprising a step of:
   e) after completing the hard handover, receiving frame offset information calculated based on a system frame number (SFN) of the target base station, wherein the SFN is acquired through the common frequency of the source base station and the target base station.

3. A method for a handover by using a compressed mode implemented in a wireless communication system and a common frequency between neighbor stations, comprising the steps of:
   a) at a mobile station, measuring signal intensities of a common frequency of a target base station and a source base station based on a downlink compressed mode and reporting the signal intensities to a controller of a base station;
   b) according to a hard handover invocation received from the base station controller, performing an intra cell hard handover from a frequency of currently established communication link to the common frequency of the source base station and the target base station,
   wherein a plurality of compressed mode frames and a guard time between two compressed mode frames are used for the intra cell hard handover, the compressed mode frame preceding the guard time is a last frame of the frequency of the currently established communication link and the compressed mode frame following the guard time is a first frame of the common frequency; and
   c) performing an inter-cell soft handover between the source base station and the target base station by using the common frequency of the source base station and the target base station.

4. The method as recited in claim 3, further comprising the step of:
   d) after completing the hard handover, reporting a frame offset information to the base station controller, wherein the frame offset information is calculated by using a system frame number (SFN) of the target base station, and the SFN is acquired through the common frequency of the source base station and the target base station.

5. A computer readable record medium storing instructions for executing the method for performing a handover based on a compressed mode and a common frequency between neighbor base stations, comprising functions of:
   a) receiving signal intensities of a common frequency of a source base station and a target base station, wherein the signal intensity is measured by a mobile station based on a downlink compressed mode;
   b) determining whether a handover condition is satisfied based on the signal intensities;
   c) if the handover condition is satisfied, invoking the mobile station to perform an intra cell hard handover from a frequency; which is currently established communication link to the common frequency of the source base station and the target base station,
   wherein a plurality of compressed mode frames and a guard time between two compressed mode frames are used for the intra cell hard handover, the compressed mode frame preceding the guard time is a last frame of the frequency of the currently established communication link and the compressed mode frame following the guard time is a first frame of the common frequency; and
   d) invoking the mobile station to perform an inter-cell soft handover between the source base station to the target base station by using the common frequency of the source base station and the target base station.

6. A computer readable record medium storing instructions for executing the method for executing the method for performing a handover based on a compressed mode and a common frequency between neighbor base stations, comprising functions of:
   a) at a mobile station, measuring signal intensities of a common frequency of a target base station and a source base station based on a downlink compressed mode and reporting the signal intensities to a controller of a base station;
   b) according to a hard handover invocation received from the base station controller, performing an intra cell hard handover from a frequency of currently established communication link to the common frequency of the source base station and the target base station,
   wherein a plurality of compressed mode frames and a guard time between two compressed mode frames are used for the intra cell hard handover, the compressed mode frame preceding the guard time is a last frame of the frequency of the currently established communication link and the compressed mode frame following the guard time is a first frame of the common frequency; and
   c) performing an inter-cell soft handover between the source base station and the target base station by using the common frequency of the source base station and the target base station.

* * * * *